SAMUEL NATELSON
*INVENTOR.*

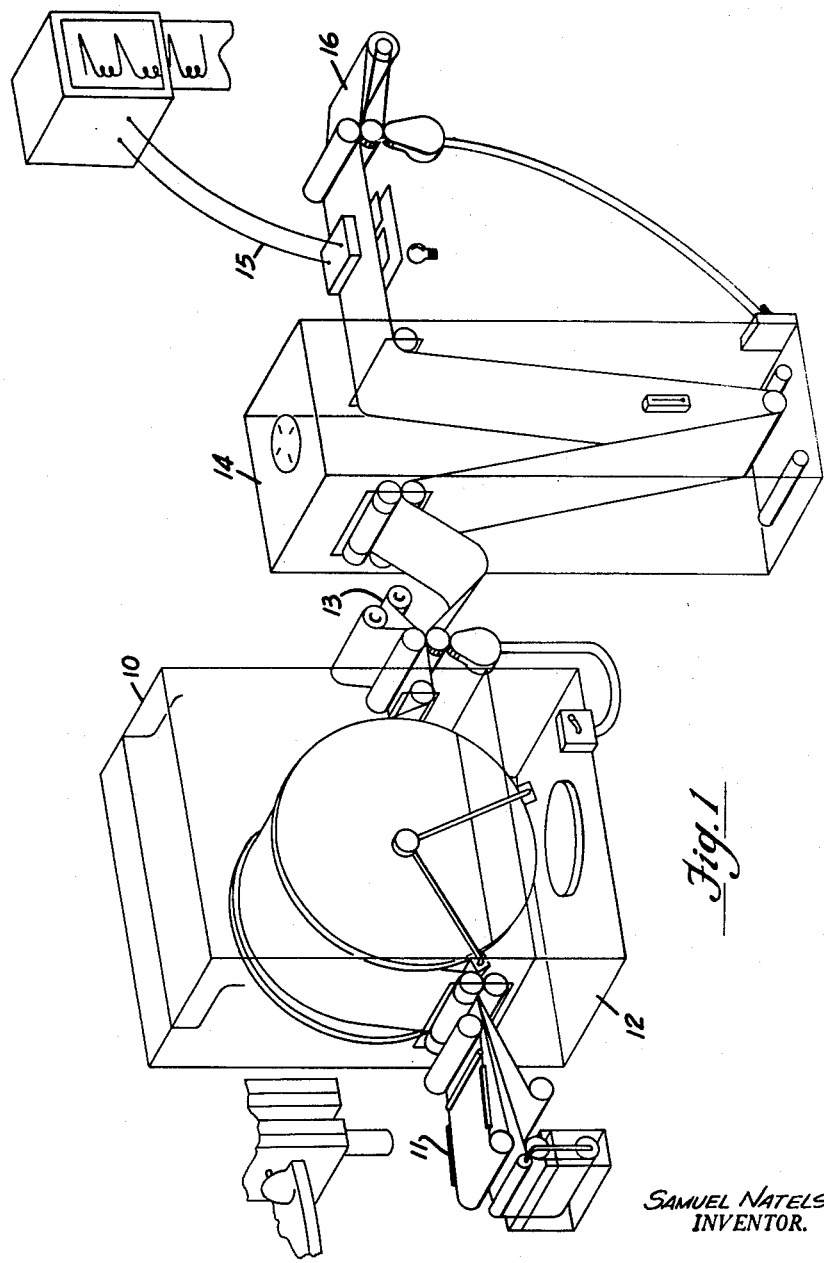

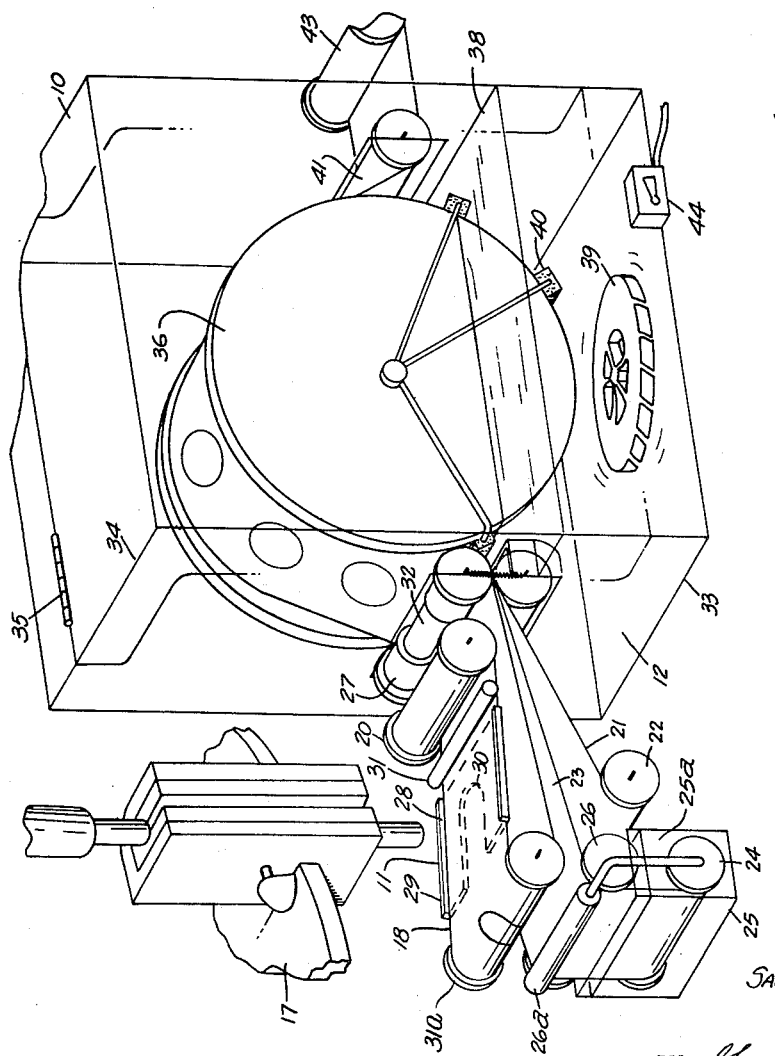

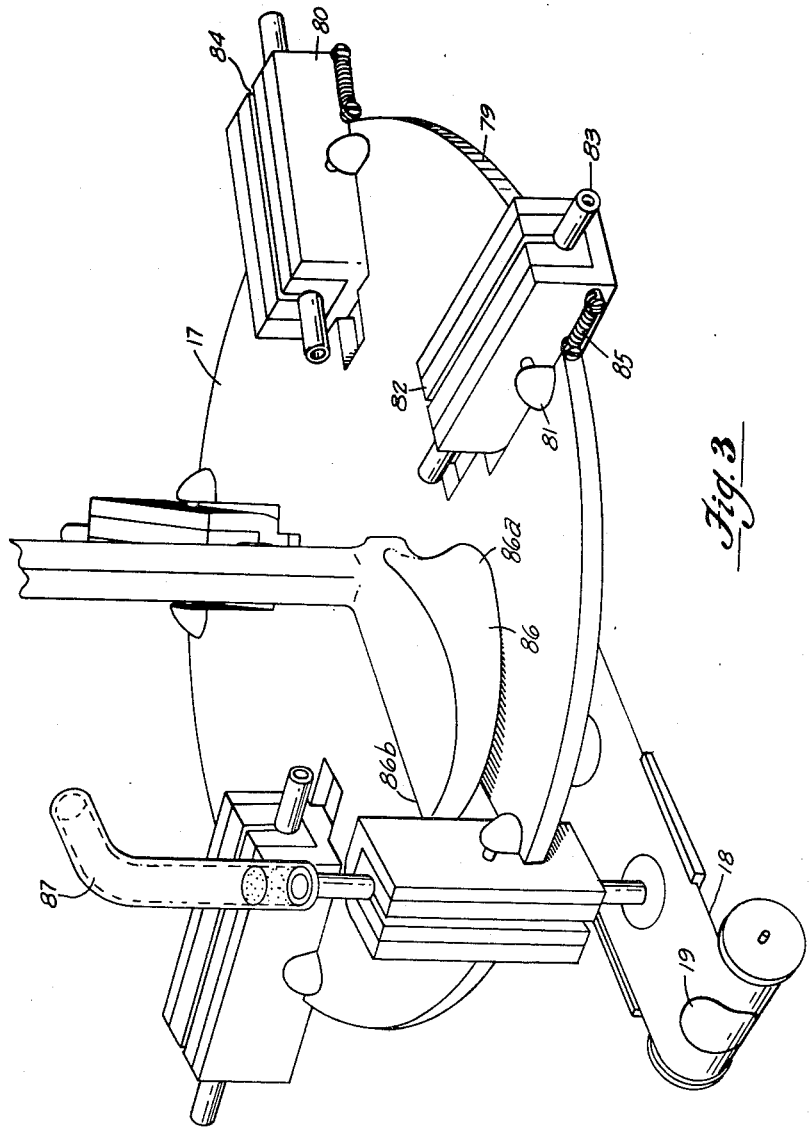

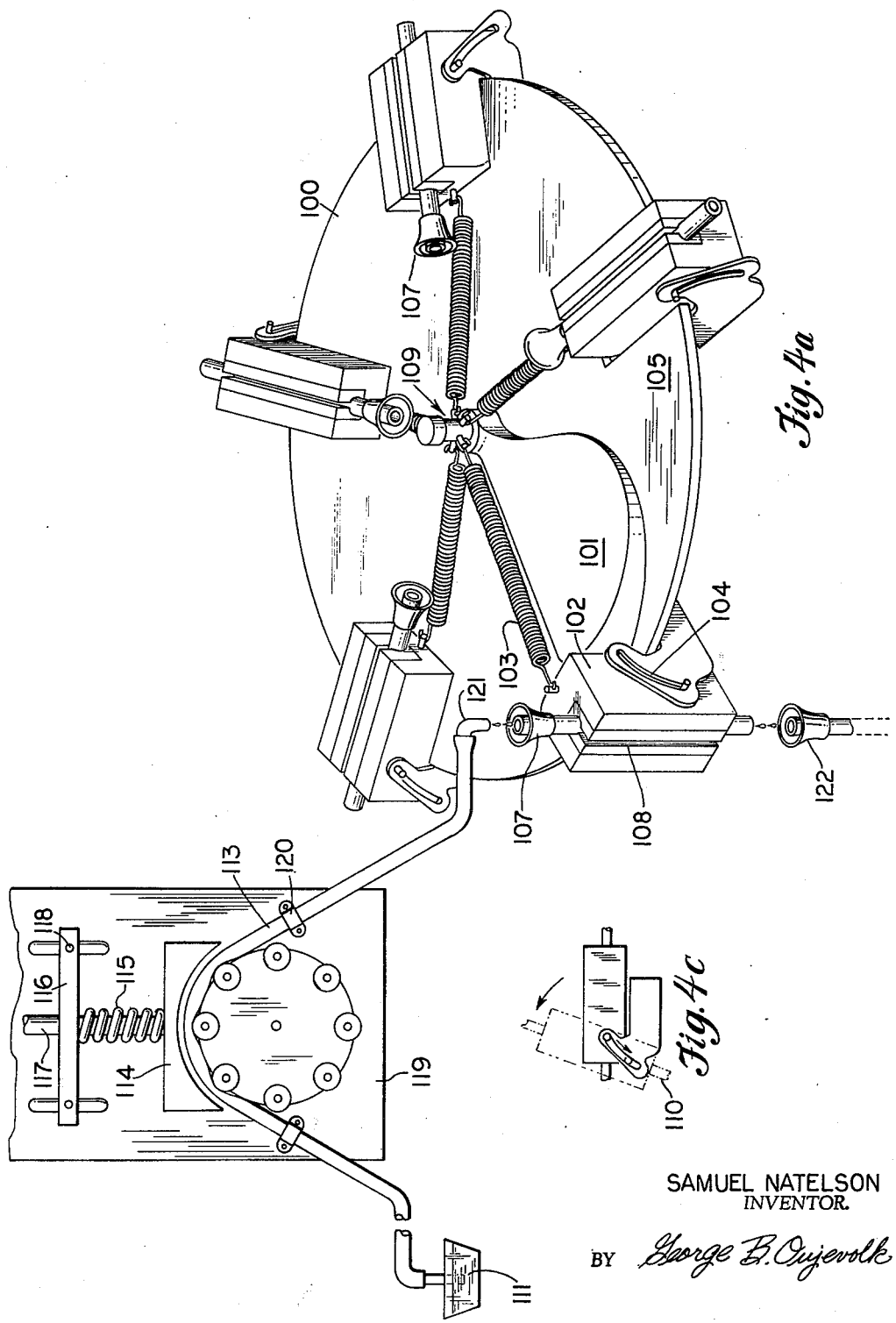

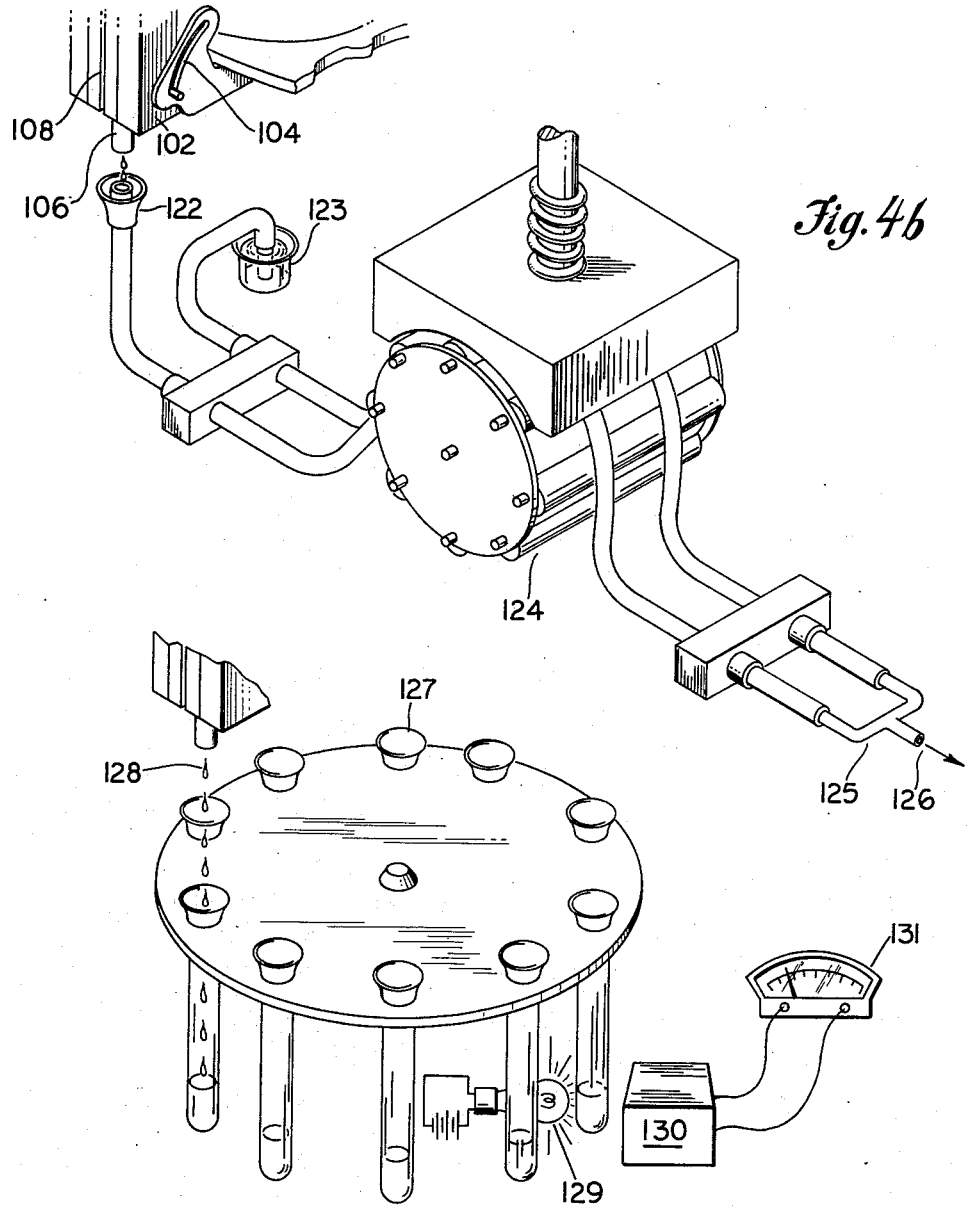

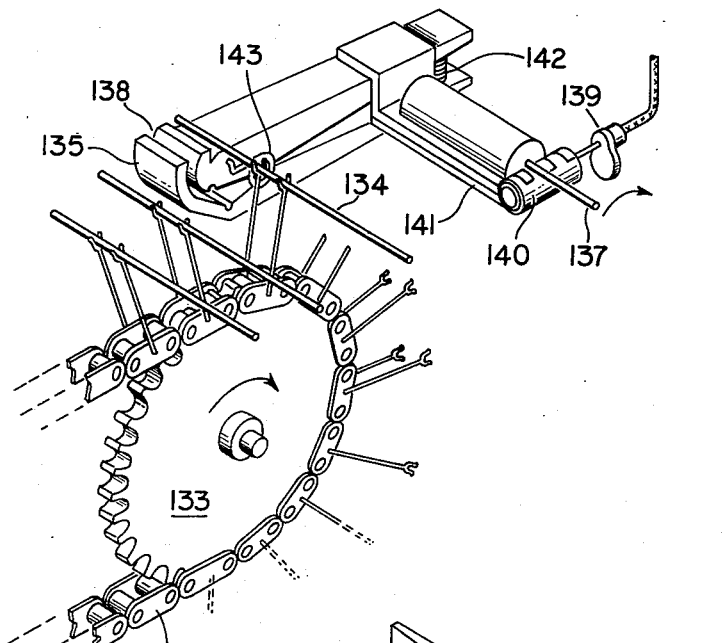
Fig. 5a
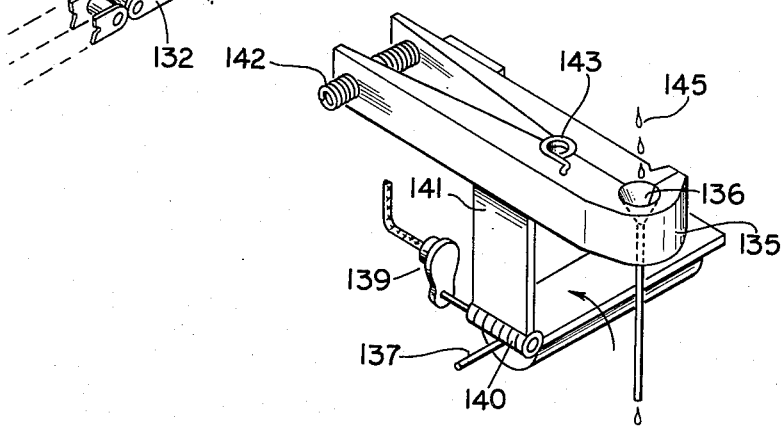
Fig. 5b
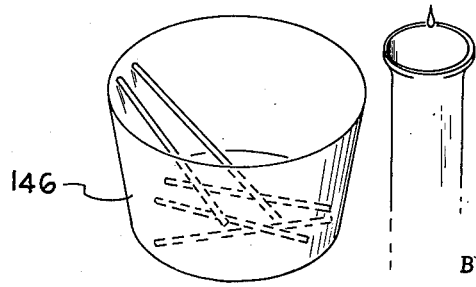

BY George B. Oujevolk

ATTORNEY

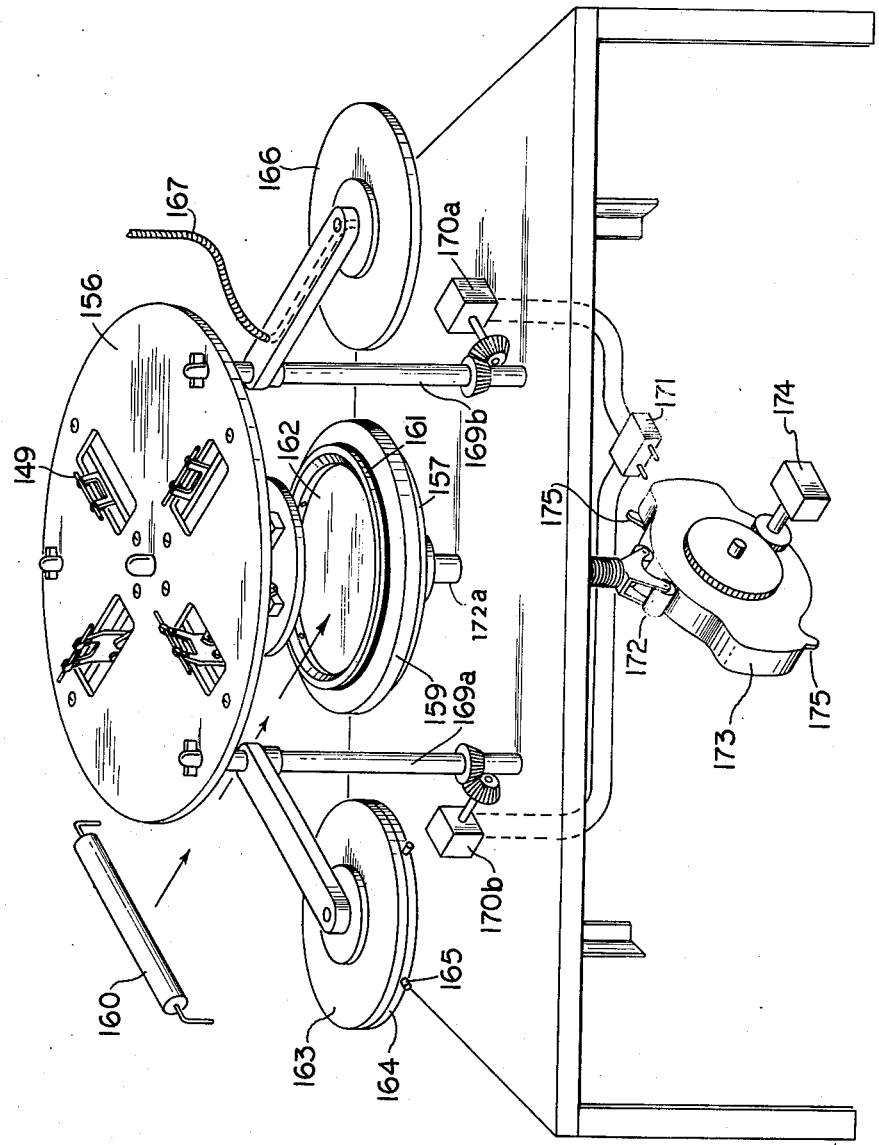

Nov. 9, 1965

S. NATELSON 3,216,804

AUTOMATIC CHEMICAL ANALYZER
AND SAMPLE DISPENSER

Filed Jan. 31, 1962

SAMUEL NATELSON
INVENTOR.

BY George B. Oujevolk

ATTORNEY

United States Patent Office 3,216,804
Patented Nov. 9, 1965

3,216,804
AUTOMATIC CHEMICAL ANALYZER AND
SAMPLE DISPENSER
Samuel Natelson, Valley Stream, N.Y., assignor to
Scientific Industries, Inc., Springfield, Mass., a corporation of Delaware
Filed Jan. 31, 1962, Ser. No. 170,084
11 Claims. (Cl. 23—253)

This patent application is a continuation-in-part of U.S. patent application Serial No. 14,894, filed March 14, 1960, now U.S. Patent No. 3,036,893.

The present invention relates to the chemical analysis of substances, and more particularly to an apparatus for the automatic continuous analysis and dispensing of substances.

The chemical laboratory is often faced with the problem of the analysis of large numbers of samples. This is time consuming and tedious to the operator, often resulting in error due to the large number of samples being assayed and the close attention one must pay to each step of the procedure. The fatigue which sets in often results in errors being introduced. In many cases, several operators are required to finish the work of the day.

To relieve this condition, instruments have been introduced which automatically sample the material to be analyzed, add reagents, and go through elaborate processes both as regards procedure and instrument to preform the analysis automatically. In general, the instruments presently in use have been designed to mechanically reproduce the work performed by the human operator. Therefore, from the standpoint of time saving, these devices take about as much time to perform their functions as their human counterpart. These instruments require appreciable amounts of material for analysis and do not lend themselves readily to adaptation for the analysis of ultramicro samples of the order of microliters.

Modern hospital laboratories must treat material in test tube quantities and in less than test tube quantities, i.e., in micro quantities. Although in test tube quantities, the procedure is somewhat easier, nevertheless, the substance which must be treated for analysis must be introduced in precise quantities to test tubes, solvents, reagents, etc., and the reagents themselves must be supplied in precise quantities to the substance being treated. This is accomplished by individual measuring steps, simulating the actions of the laboratory technician. With regard to micro quantities of substances, heretofore, tape devices, particularly where paper tapes are employed were not considered suitable for the chemical analysis of substances. This is because of the irregular spot formation. One of the last stations in an automatic chemical analysis device is usually a reading means, e.g., a densitometer. This device has no way of distinguishing between even and uneven spots. Furthermore, if the components of the sample drop or specimen are not properly or uniformly distributed, visual study of the curves and peaks recorded by the reading means is impossible. This may best be understood from the following observation. When a drop of water is dropped on a piece of paper which has been impregnated with a colored reagent which is water soluble, the water will spread. In so doing, it will dissolve the reagent and move it away from the center where the water has been dropped. On drying, a ring will be observed. The center of the ring will be white, where the reagent has been washed away. The outer ring will be dark where the reagent has been concentrated. For this reason, it is impractical to perform a quantitative test by dropping a test solution on a reagent paper. If attempted, one would obtain a thin ring surrounding the area of application. When sent through the reading means, the reading means would read in error. The center of the spot will be clear and allow too much light to go through. The ring concentration will be underestimated since light will not pass the high concentration of color in the ring.

Although attempts were made to overcome the foregoing difficulties and other difficulties and disadvantages, none, as far as I am aware was entirely successful when carried into practice commercially.

It is therefore an object of the present invention to provide a device which can be used for the analysis of micro quantities of substances permitting the multiple analysis of several constituents simultaneously.

Another object of the present invention is to provide means for either simultaneeously or sequentially dispensing uniform small quantities of substances.

A further object of the present invention is to provide a device which is capable of rapidly processing a large number of samples supplying the result in a very short period of time.

Yet another object of the present invention is to provide a device which is versatile, without changing to elaborate equipment during intermediate stages of the operation.

With the foregoing and other objects in view, the invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying drawing, showing by way of example, preferred embodiments of the inventive idea.

FIGURE 1 is a longitudinal view of one embodiment of the automatic chemical analyzer contemplated herein;

FIG. 2 is an enlarged view of the left hand portion of the apparatus depicted in FIG. 1;

FIG. 3 is a perspective view of an embodiment of the sample dispenser partly shown in FIGS. 1 and 2;

Figure 6A:
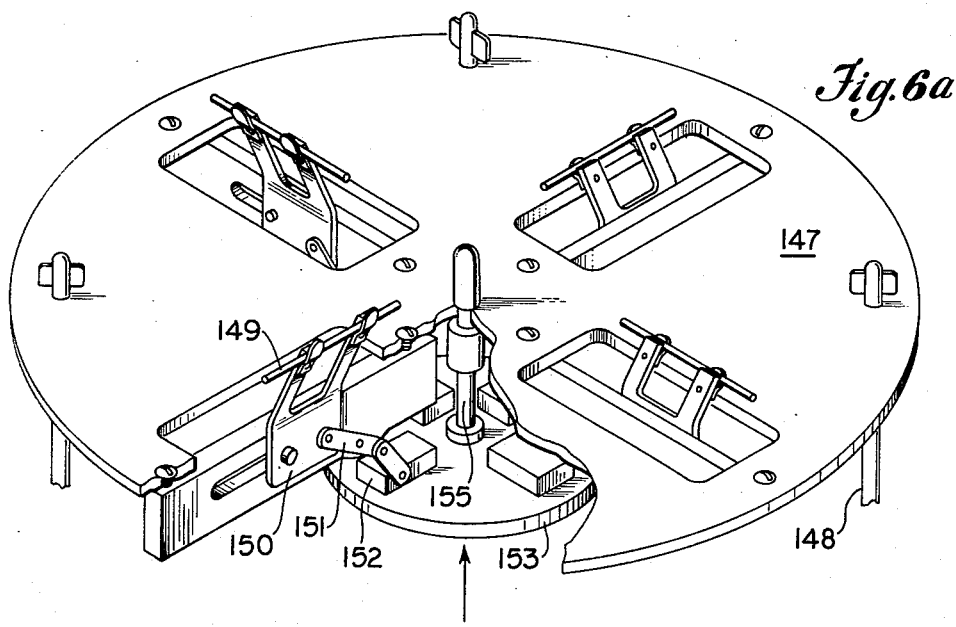
Figure 6B:
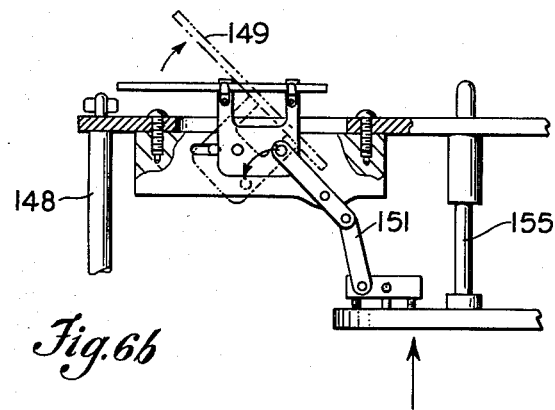
Figure 7C:
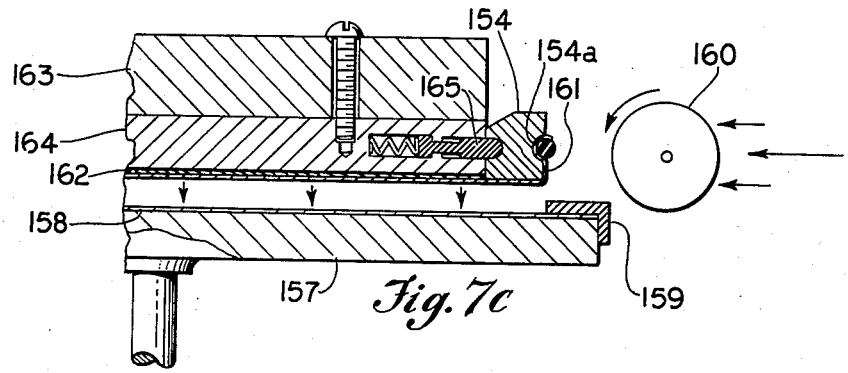
Figure 7B:
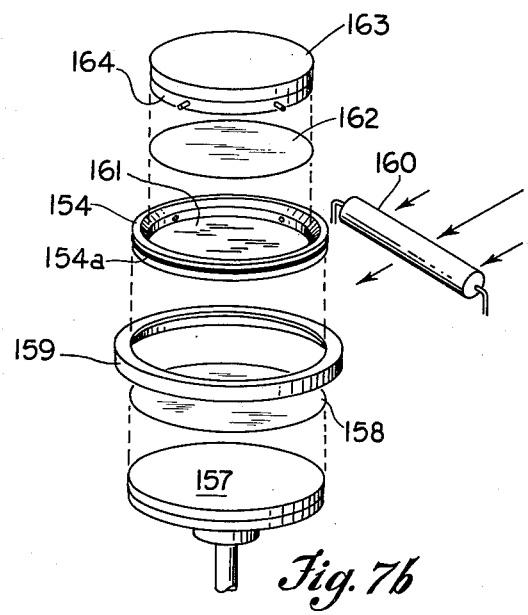
Figure 7D:
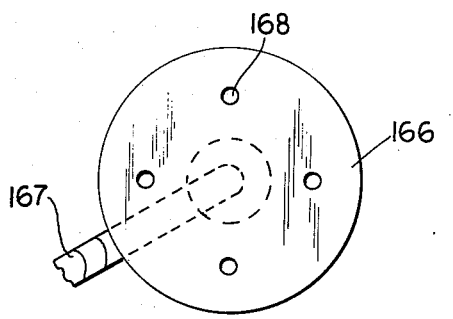

FIGS. 4a, 4b, and 4d illustrate in perspective the principal components of another embodiment of an apparatus contemplated herein suitable for the sequential chemical analysis of substances;

FIG. 4c is a longitudinal view of one of the sample capillary tube holders shown in FIG. 4a together with tilting motion means required to empty the tube;

FIGS. 5a and 5b show another embodiment of a capillary tube holder and tilting motion means contemplated herein;

FIG. 6a is a perspective view of simultaneoeus dispensing means, a portion of the dispensing means being cut away to better illustrate the tilting motion means;

FIG. 6b is a longitudinal cross sectional view of the tilting motion means depicted in FIG. 6a;

FIG. 7a is a perspective and partly cut away view of another embodiment of an automatic chemical analyzer contemplated herein using the dispensing means shown in FIG. 6a;

FIG. 7b is an exploded view of a portion of the apparatus shown in perspective in FIG. 7a;

FIG. 7c is a longitudinal cross sectional view of another portion of the apparatus shown in FIG. 7a; and, FIG. 7d is a bottom view of still another portion of the apparatus shown in FIG. 7a;

Generally speaking, the present invention contemplates a dispensing arrangement for simultaneously or sequentially dispensing a small sample from capillary tubes, together with means for further processing and treating the sample so that recordable readings can be obtained from the sample by reading means.

According to one contemplated embodiment shown in FIG. 1, the apparatus 10 includes input means 11 where the sample is dispensed into sample receiving means; transfer means 12 where the sample is transferred from the sample receiving means to test means; separation means 13 where the sample is placed in condition for reading or further treatment; treating means 14 where the sample can be treated so that it can be analyzed, e.g., by heating; reading means 15 where the treated sample is read; and, a terminal 16 where the sample and its container or carrying means is taken up or discarded.

The samples to be tested or analyzed are contained in a dispenser 17 and are received from dispenser 17 on a sample receiving tape 18. Advantageously, this tape will have been pretreated so that the dropping of the sample on the tape will form confined spots 19. Confined spots are formed by forming rings of water repellant material, e.g., wax or plastic on filter paper. When a sample is dropped in such a ring, the spot formed by the sample will be confined to the area inside the ring, and, uniformity of the spot is thus obtained.

A circular spot may also be obtained on paper when a sample is dropped thereon by using a specially prepared filter paper. Ordinary filter paper is so grained that a spot dropped on the paper will run in one direction better than at right angles to that direction. Thus an elongated spot is obtained. By preparing paper in such a way that the fibers extend randomly equally in all directions, a so-called "non grainy" paper is obtained. On this type of paper, the sample will distribute itself essentially uniformly in all directions.

The sample receiving tape 18 is usually contained on a pay off, e.g., sample receiving tape pay off roller 20. For convenience, no supporting means are shown for the rollers or reels herein described, it being of course well understood that such supporting means are provided.

To receive the sample, there is provided a sample receiving plate 28, having guide means 29, and it is towards this sample receiving plate 28 that the sample from dispenser 17 will be directed, e.g., blown, dropped, aspirated or touched so that it drains by capillarity. In order to avoid any contamination of the sample which will be placed on the sample receiving tape, a horseshoe shaped recess 30 may be provided in the sampling plate at the spot where the sample is placd on the tape. Thus, in this embodiment, the plate serves only as a support, and the sample itself never touches the plate. To further insure accuracy in placing the sample on the tape, a sample receiving tape idler roller 31 may be provided. This will prevent the tape from having any crimps or bumps and aids in the uniformity of the sample spot placed on the tape.

As illustrated in the drawing, at this portion of the apparatus, the sample receiving tape travels backwards, i.e., counter to the direction of travel of the other tapes. After passing the station where the sample receiving plate is located, the sample receiving tape 18 goes over a reversing roller 31a which will place the confined spot and sample thereon face down. As the confined spot 19 with a sample thereon has a tendency to bulge at the center, this reversal of the tape, i.e., having the confined spot which received the sample in a face up position turned around to a face down position, will facilitate the eventual transfer of the sample placed on the sample receiving tape 18 to a test tape 21. When advantageous to the tests being conducted, this test tape 21 may also contain a reagent. Test tape 21 also comes on a pay off, e.g., test tape pay off roller 22. In one variation this roller also dips in a reagent solution (not shown) so that the test paper need not be treated with reagent. Sandwiched in between the sample receiving tape 18 and the test tape 21 is an intermediate tape 23. This tape must be porous, the degree of porosity will depend on the sample tested and on the treatment to which the sample is subjected. For proteins, total lipids, mucoproteins, etc., where larger molecules are being assayed, the porosity of the tape must be increased to allow these molecules to go through. Likewise, the degree of porosity of the tape may also be used as an effective means for separating components of the samples being tested.

The intermediate tape pay off means, e.g., roller 24 is located in a water tank 25 having sufficient water 25a to keep the intermediate tape wet or fairly moist. In this connection, an intermediate tape made of cellophane has been found particularly useful for certain hospital laboratory analysis, e.g., sugar, urea, calcium, uric acid, creatinine, and amino acids where it is desired to prevent proteins from reaching the test tape.

These three tapes, i.e., the sample receiving tape 18, the intermediate tape 23 and the test tape 21 are all directed towards a pair of spring loaded rollers 27 located at the entrance of the transfer means 12. The function of these rollers is to bring the three tapes into close contact so that the sample can be transferred from the sample receiving tape to the test tape through the intermediate tape. Just as the sample receiving plate 28 and roller 31a have recesses so as to avoid contamination of the sample, so do the spring loaded rollers 27 likewise have a recess 32. This principle of recessed parts may be carried out throughout the apparatus of this particular embodiment.

The tapes now enter transfer means 12 which is completely enclosed in enclosure 33, preferably made of transparent plastic, and advantageously having a door 34. This door is to facilitate adjustment or repairs and can be a simple affair held by hinges 35. Naturally the entire enclosure need not be transparent, just so long as the operator can see what goes on inside the enclosure and make certain that the device is functioning properly. Inside the transfer means is a fairly large drum 36. The bottom portion of the enclosure 33 has continuously flowing water 38 which keeps the drum wet. A circulating pump 39 is provided to keep the water moving, and, a sponge or sponges 40 are provided to aid in washing and wetting the drum. It is while moving through the transfer means that the material to be tested is transferred from the sample receiving tape to the test tape through the intermediate tape. At the exit of transfer means 12, there may be provided an idler 41 to facilitate the passage of the tapes. From the transfer means 12, the tapes pass to a separation means 13. This is the end of the line for two of the tapes. Driving means are provided in this zone to drive the tapes. The sample receiving tape and the intermediate tape are wound on rollers provided for this purpose. The rollers in turn are driven by driving means so as to reel in the tapes. The test tape which now contains the sample is not taken up at this stage but passes on to treating means 14 which as illustrated in the drawing comprises an elongated chamber having heating means therein. Additional rollers may also be provided in this zone to lengthen the travel time of the tape therein. It has also been found particularly useful to have a washing station in the zone adapted to wash the excess reagent or sample from the test tape. Upon leaving the treating means, the test tape enters a reading means 15 where the results of the test or analysis will be read on a densitometer 61. An appropriate light filter acting in combination with a light source 62 is on one side of the tape, and a photo cell 64 is on the other side. The action of the light on the densitometer will be plotted on graph paper 65 which shows the peaks made by a pen. This type of densitometer 61 is known in the art. The test tape has now served its purpose and come to the end of its road. It therefore enters terminal 16 which in this case has take up means, e.g., a take up reel to take up the tape.

To feed the sample to the device just described, there is provided a sample dispenser 17 shown in FIG. 3, preferably driven by the same driving means as are used to drive the device. The dispenser should be releasable or detachable from the device to permit manually feeding the sample receiving tape. The dispenser includes circular positioning means 79 (FIG. 3) on which a plurality of holders 80 are mounted near the edge of the positioning means by pivot means 81. In each holder 80, there is provided a bed made of rubber or other resilient material into which a capillary tube 83 is inserted through a slit 84. Spring means 85 keep the beds with the tubes therein in the horizontal position. At one point over the positioning means an adjustable cam 86 is provided. This cam is not fastened to the positioning means but to the frame of the dispenser which is not shown in the drawing. One end, 86a of the cam will engage one of the tube holders 80 as it comes around on the positioning means and gradually tilt it and the tube inside to a vertical position as the tube holder reaches the cam other end 86b. It is under this point on the cam that the sample receiving tape 18 with the confined spots 19 passes. Over this point in the device there is provided air pressure means 87 which will blow on the capillary tube and force the sample onto the sample receiving tape confined spot. This air pressure means is lifted as the capillary moves into position and lowers to touch the capillary when air pressure is applied. A porous rubber sheet covering the air outlet permits contact with the capillary without danger of breaking it. In one variation, a vacuum is applied by a similar tube underneath the sample receiving tape and aspirating air through the paper causes the sample to adhere to the paper. In practice, circular positioning means capable of holding fifty capillaries can be constructed. When the capillary tubes have been inserted in the horizontal position they can be rapidly filled by simply touching the sample to the tip of the capillary. It then runs right to the other end of the tube. For most tests, capillary tubes of between 0.2 to 1.5 mm. bore and capable of containing from 0.01 to 0.05 ml. are preferable, but in some cases, capillary tubes of less than 0.1 mm. bore are used.

A sample dispenser of the type used to feed a sample to the three-tape device shown in FIGS. 1 to 3 may also be used to feed samples to an automatic chemical analyzer containing or using test tubes. When used for this purpose, it may be preferable to make some change in the tilting means.

Device 100 is an arrangement for the sequential delivery of samples from capillary tubes and washing through the capillary tube. In such an arrangement, the dispenser may be at one of the first stations or at one of the last stations in the process. Furthermore this type of arrangement has the advantage that the various components may be disassembled and programmed to perform a variety of chemical reactions. In the arrangement of FIGS. 4a to 4d, the wedge-shaped positioning means 101 revolves and sequentially lifts the capillary holders 102. The capillary holders 102 are retained in the horizontal position by tension springs 103. The tilting path of the capillary holder 102 is controlled by an arcuate slotted guide 104 which will so direct the capillary that the tip of the capillary tube is always over the sample receiving means. The holder 102 rests in the mounting plate 105 and when tilted by the tilting means 101, there is no loss of sample from the capillary as the end is always over the sample receiving means. This is best illustrated in the drawing by capillary tube 106 shown in the vertical position with a wash solution dripping through the tube. To direct the action of the wash liquid, a plastic funnel 107 is fitted on the capillary tube, which is held firmly in a rubber bed 108. The wedge-shaped tilting means and the springs holding the capillary tube are retained by a center post 109. The tilting action of the capillary tube is best illustrated in FIG. 4d showing how the horizontal to vertical movement of the tip 110 of the capillary tube is along a straight line.

In the embodiment of FIGS. 4a to 4d, a solution 111 which may be water, saline, or a reagent is to be pumped to a capillary tube as a wash solution. The pumping action will be performed by a wheel with rollers 112 acting on plastic tubing 113 to pump the wash solution. The tubing is firmly held against the rollers by a spring loaded clamp 114. The spring 115 is held at the desired tension by a flat metal plate 116 having a hole at the center thereof through which a center rod 117 is free to slide up and down. The tension on the spring may be adjusted by adjustment screws 118. This pump assembly is mounted on a metal plate 119. The pump is actuated by a motor turning the wheel (the motor is not shown). The motor is in back of the metal plate. To prevent slippage of the plastic tubing, there is a stop and collar 120. The plastic tubing of the pump terminates in a glass spout 121 through which the wash solution drips. This action is controlled by the pump motor so that flow occurs and the spout drips only when the capillary is in the vertical position.

The washed sample solution falls into a funnel 122 which will carry the sample containing solution to a reaction or assaying zone. A reagent 123 can be pumped and mixed with the sample-containing solution in a pump 124 similar to the pump just described but adapted to act on a plurality of tubes. The sample and the reagent are combined at a junction point 125 so as to produce a reaction suitable for assay. From the junction point 125 the sample and reagent-containing solution move to a zone 126 where further treatment may take place and finally where the color produced may be read in a flow colorimeter, fluorimeter, or other reading device such as a flame photometer.

To illustrate the versatility of the foregoing arrangement, there is shown in FIG. 4d a rotating table 127 carrying test tubes for collection of samples and wash solution which are sequentially deposited in different test tubes. The mixture of wash solution and sample 128 is dropped into the test tube by the tilting of holder 102. The rotating test tubes pass a reading station having a light 128 shining through the test tubes and a photocell 130 recording the intensity of the light passing through the test tube by means of an ammeter 131.

It is also possible to sequentially deliver large numbers of samples from capillary tubes and wash through the sample in the capillary tube as depicted in FIGS. 5a and 5b. Here, a chain or gear drive 132 carries the capillary tubes 134 horizontally while the revolving motion is in the vertical plane. The gear 133 is rotated by a motor (not shown) to move the capillary tubes sequentially into position. As the capillary tube reaches the dispensing station it will be grasped by a plastic clamp 135 designed to hold the capillary tube about midway in the clamp. A funnel 136 is provided in the clamp for receiving the wash solution and directing it into the capillary tube. Clamp 135 rotates on an axle 137 in a clockwise direction; the axle is driven by a motor (not shown). The clamp is provided with spring clothespin-type of jaws 138 which can open and close and are designed to grasp the capillary tube. The clamp is mounted on a two fold arm 141, the folds joining at a hinge 140, the two fold arm being normally in the folded over position, i.e., one fold over the other so that the action of the arm and the clamp in lifting the capillary tube will keep the tip of the tube always at the same point. The tip acts as the center of rotation for the capillary tube 134 acting as a radius. After the clamp has rotated on axle 137, arm fold 141 holding the clamp will swing 90° on hinge 140 to empty the capillary tube. A motor 139 causes the hinge to swing.

Spring clothespin-type clamp 135 has a spring 143 which tends to maintain the clamp in the closed position and a solenoid 142 which is enabled by an electric current through the wires surrounding it to open the clamp so that it can grasp a capillary tube.

As the capillary tube is moved along by chain 132 it reaches the dispensing station. The rotating clamp 135 picks up the capillary tube, clamps down on it and continues its rotation carrying the capillary tube away from the chain. The rotary motion stops 180° from the place where the clamp picked up the tube and the hinge swings to place the capillary tube in a vertical position. Wash solution 145 drips into the capillary tube washing the sample out of the capillary tube. The hinge then swings back, bringing the capillary tube to the horizontal position. As rotation continues, the jaws of the clamp open causing the capillary tube to drop into a waste basket 146. The cycle is then repeated with the new capillary tube brought into position by the chain.

Up to now, the devices described were designed for the sequential delivery of samples for further processing. But, in a modern hospital, the laboratory technician may have several hundreds of samples daily and indeed may have a rush period lasting one or two hours when numerous samples must be processed. The sequential processing of the samples is then too time consuming.

To process a plurality of samples simultaneously, the device shown in FIGS. 6a to 7d is preferred. For simplicity, the device is illustrated as holding only four capillary tubes. In the device actually constructed, many more capillary tube holders are provided.

The dispensing mechanism (FIGS. 6a and 6b) is carried on a circular metal plate 147 which is supported by three or four posts 148 and held by lock-nuts. The capillary tubes 149 are held in position by clamps 150 over a radial slot in the plate. The clamp holds the capillary at an angle so that the tilting of the capillary from the horizontal to the vertical will avoid the mechanism when delivering the sample. In the previous embodiments, the sample was delivered and the capillary tube was tilted outwards towards the periphery of the circular dispenser. However, in the present embodiment, the capillary tube is tilted inwards towards the center of the circular dispenser by a linking arrangement 151 which will maintain the tip of the capillary tube over the point of delivery. This is advantageous for when loading the capillaries, the sample is touched to the outside end. The sample which touches the outside of the capillaries does not touch the sample receiving paper. The sample receiving paper then only absorbs the contents of the tube and not what is on the outside.

The movement of each linking arrangement 151 is controlled by a metal block 152 which tilts the clamp when the block is moved upwards. If desired, the blocks may be actuated either sequentially or simultaneously. To simultaneously move the metal blocks 152 there is a block holding plate 153 tying all the metal blocks together. When plate 153 is moved upwards, the linkages exert pressure on clamp 150 causing it to slide in the slot and turn. The capillary tube now executes a rotational and downwards motion terminating in a vertical position. The tip is maintained at all times directly over the spot where the sample is to be delivered. When the tip of the capillary tube touches the paper, the liquid in the tube will drain out completely from the capillary tube because of the capillary action of the paper. This is best illustrated in FIG. 6b illustrating the motion of the clamp and capillary tube. The dotted figure shows the clamp partially descending and keeping the tip of the capillary directly over the spot where the sample is to be delivered. To better correlate the action of plates 153 and 147, an axial guide rod 155 is provided.

The application of the simultaneous dispensing of samples to the chemical analysis of small quantities of liquid samples is illustrated in FIGS. 7a to 7d. The device there illustrated operates on principles that are similar to the device shown in FIGS. 1 and 2. The operator touches the liquid samples to be processed to the capillary tubes 149 of uniform bore and length of dispenser 156. Here, the three tape arrangement used in FIGS. 1 and 2 is replaced by a three disc arrangement shown in the exploded view of FIG. 7b. The sample from the capillary tubes will be received on a sample receiving disc 162 of filter paper. The sample placed on sample receiving disc 162 is passed to a test disc 158 also of filter paper through a porous membrane 161. To accomplish this, test disc 158 is placed on a test disc holding plate 157. This is a metal plate coated with plastic axially aligned with block-holding metal plate 147 and can move up and down as desired. The test disc is held in place my a circular plastic ring clamp 159. Ring clamp 159 has an inverted L-shaped cross section as shown in FIG. 7c so as to firmly hold down the test disc 158. Placed over the test disc 158 and within the ring formed by ring clamp 159 is a membrane holding ring 154 having a groove 154a therein to hold a rubber band or O-ring. The porous membrane is held by membrane holding ring 154 by having the membrane 161 stretched across the ring and slipping the rubber band or O-ring over the membrane and into groove 154a. The membrane is so placed on the test disc 158 that the membrane is in contact with the disc. Sample receiving disc 162 is then placed in the center of ring 154 over the membrane so that now the membrane is sandwiched in between the two sheets of filter paper. A roller 160 is also provided which can roll over the test paper and deposit a reagent thereon. This roller is kept out of the field when not in operation. In another variation (not shown) the reagent may be measured out on the center of test disc 158 by means of a syringe which then is moved out of the field. Spinning of plate 157 will cause the reagent to distribute itself evenly provided "non grainy" paper is used for the purpose. In still another variation, the reagent may be stamped from a circular pad containing the reagent directly on test disc 158.

As explained in connection with the device of FIGS. 1 and 2, the sample which is first placed on the sample receiving means must be transferred to the test means through a porous membrane to obtain a uniformed spot which can be presented to reading means. To accomplish this, the sample receiving means, the test means and the membrane must be pressed firmly together so that the sample may pass through the membrane onto the test means. Furthermore, when a reagent or other reacting component is admixed with the sample, heat treatment may be required to accomplish the desired reaction. In this case, plate 157 is supplied with an electric coil of resistance wire cast therein so as to control its temperature. This heating coil may also be placed in the weighted metal disc 163.

In the present embodiment, a weighted metal disc 163 is used for applying pressure for a fixed period of time to cause the diffusion of the sample through the porous layer or membrane onto the test paper. Attached to weighted disc 163 is a plastic layer 164 which serves as a barrier between the metal disc and the filter paper. Furthermore, this plastic layer 164 carried spring loaded fastening means 165a which are designed to snap into and engage corresponding recesses 165b in membrane holding ring 154 holding porous membrane 161 and on which has been placed the sample receiving disc 162. Once spring loaded fastening means 165a have snapped into recesses 165a, when the weighted disc 163 is removed, it will carry with it the membrane 161 and the sample receiving disc 162. After the membrane and sample receiving disc have been removed from their position over the test disc 158, hollow plate 166 will be positioned over the test disc to blow hot air on the test disc to dry it and help develop the reaction taking place thereon so as to produce a color or fluorescence. The hot air or gases are fed to hollow plate 166 by hose 167. Openings 168 in the hollow plate permit the hot air to act on the test disc. Weighted disc 163 and hollow plate 166 swing into and out of position over the test disc on arms 163a and 166a. These arms in turn are moved by hollow bearings turning on supporting rods 169a and 169b. These rods in turn are rotated by motors 170a and 170b swinging the respective arms and weighted disc or hollow plate into the field over the test disc.

The sequential programming of the up and down action of the test disc holder, the swing into the field of the weighted disc, and the swing out of the field of this same weighted disc together with the sample receiving disc and the membrane and then the swing into and out of the field of the hollow plate may be accomplished by techniques known in the art of control engineering. But, since the present invention relates more to the chemical art, an understandable explanation of how this is accomplished is outlined in the drawing. The program is controlled by a cam wheel 173 having trips 175a and 175b thereon to engage switches 171a and 171b for motors 170a and 170b, i.e., the motors which control the action of the weighted disc and the hollow plate. The cam wheel 173 has riding thereon a roller bearing arrangement 172 driving test disc holding plate rod 172a. The shape of cam wheel 173 is such as to drive test disc holding plate rod 172a up and down in accordance with the set program of operation when trips 175a and 175b will engage switches 171a and 171b. Cam wheel 173 is driven by a motor and gear arrangement 174.

In practice, test disc holding plate 157 having thereon the test disc, membrane and sampling receiving disc moves upwards pushing against block holding plate 153. This results in the capillary tubes being all simultaneously tilted from the horizontal to the vertical position so as to deposit the samples on the sample receiving disc. Plate 157 now moves down to a low position and weighted disc 163 moves into position above it. Plate 157 again moves up, engages weighted disc 163, applying pressure between the sample receiving disc, the membrane, and the test disc. This pressure is maintained for a preset period of time determined by cam wheel 173 so that the transfer of the sample to the test disc is completed. Now plate 157 moves down and weighted disc 163 swings out of the field carrying with it the sample receiving disc and the porous membrane. Hollow plate 166 now moves into position over the test disc and plate 157 again moves upwards. Hot air dries the reagent containing test disc. Plate 157 now moves down and hollow plate 166 moves out of the field. It will be noted that vertical motion up or down is performed only by plate 157 in this embodiment.

The test disc may now be removed by hand or mechanically and transferred to a reading station with a colorimeter feeding means. Here, the colored or fluorescent spots are sequentially read by a colorimeter with digital readout means to assay the concentration of the required material in the samples.

Although the foregoing explanation is sufficient to understand the operation of the various embodiments herein contemplated, it is believed that additional explanation is required with regard to the paper technique used in connection with the treatment of micro quantities of samples. As already stated at the beginning of the specification, a paper technique was not considered suitable heretofore because of the difficulty in obtaining uniform results. A careful study of paper techniques used by the applicant resulted in the finding that when conventional techniques were used of emptying a capillary tube on filter paper, an uneven spot resulted, and if the filter paper contained a reagent, the reagent was spread out towards the periphery of the spot. The automatic reading means presently available have no way of distinguishing between spots, so that unless uniform spots are presented to the reading means, uniform results are not obtainable. To produce the required uniform spots, a three sheet arrangement such as three tapes or three discs is required. The first sheet is the sample receiving means. This is an absorbent medium and may have confined spots thereon which are useful in certain reactions. Next there is a porous membrane with a multiplicity of microscopic to submicroscopic holes through which the sample which is placed on the sample receiving means is to pass. Last is the test means which may contain a reagent on which the sample makes a multiplicity of small spots, which to the eye and to the desitometer appear as one even spot. To pass the sample from the sample receiving means through the porous membrane onto the test means, it is advantageous to apply pressure to these three sheets. Also, the sample receiving means may be placed face down on the porous medium to facilitate the transfer.

For the purpose of giving those skilled in the art a better understanding of the invention the following illustrative examples are given:

*Example I.—Glucose in blood serum (enzymatically)*

To 200 ml. of N/20 phosphate buffer, pH 7 add 10 mg. of horseradish peroxidase and 250 mg. of glucose oxidase. Shake until dissolved. Now add 1 ml. of a 1% o-dianisidine solution in water and mix. Filter this solution and impregnate the test disc with it using the roller of FIG. 7a. Add human blood serum to the capillaries by touching the serum to the end of the capillaries while the capillaries are in the horizontal position. The automatic feeding device of FIG. 7a when actuated will tilt to a vertical position and drain onto the sample receiving disc. The center medium in this case is untreated cellophane, premoistened. The transfer zone is maintained at room temperature in this case. Contact time in the pressure chamber between tapes is ten minutes. The reagent paper test disc now bears a pink stain after being dried by hot air. The filter used in the densitometer has a transmission maximum of 395 mu. The height of the peaks on the recording chart are a measure of glucose concentration. Since all the samples are processed simultaneously, the results will be ready in less than 20 minutes for as many as 60 determinations.

*Example II.—Glucose in blood serum (by chemical means)*

A 1% solution of potassium ferricyanide mixed with a 1% solution of sodium carbonate, volume for volume, is used to impregnate the test paper. Serum (0.02 ml.) is added to the sample receiving disc and the procedure followed is as in Example I, using cellophane as the intermediate medium. Reaction time is ten minutes. The filter used in the densitometer is 420 mu filter. Hot air is blown on the spots for ten minutes. The ferricyanide solution bleaches and the greater the amount of glucose, the lower the reading.

*Example III.—Amino nitrogen in serum*

A solution is prepared of 20 mg. of ninhydrin and 10 mg. of hydrindantin dissolved in 100 ml. of ethyl alcohol. To this solution is added 2 ml. of collidine and 2 ml. of glacial acetic acid. This reagent is added to the reagent paper test disc of FIG. 7a as in Example I. 0.02 ml. of serum is added to confined spots on the sample receiving paper from the sampling capillaries. The central medium is cellophane as in Example I. Reaction transfer time is 10 minutes at room temperature. The purple color develops on heating with hot dry air. The filter in the densitometer is 520 mu filter. The peak heights on the recording chart or the areas under the curves produced are a measure of the concentration of amino nitrogen in the serum.

*Example IV.—Calcium in serum*

An aqueous solution of murexide is prepared in a 0.1 N solution of sodium carbonate or trisodium phosphate. The reagent paper test disc is impregnated with this solution. 0.02 ml. of serum is added to the sample receiving disc from the capillaries. The center medium is cellophane as in the previous examples. Contact time is 10 minutes. On drying the color developed is read with a 540 mu filter in the densitometer. Alizarin may be used in place of the murexide in which case a 560 mu light filter is used in the densitometer.

*Example V.—Magnesium in blood serum*

75 mg. of Titan Yellow is dissolved in 2000 ml. of a 0.1% solution of polyvinyl alcohol. 10 grams of potassium carbonate is dissolved in this solution. The reagent paper test disc is sprayed with this solution. 0.05 ml. of serum is added to the reagent paper from the capillaries. The center tape is cellophane. A 560 mu filter is used in the densitometer. Reaction contact time is 10 minutes.

*Example VI.—Protein in blood serum*

1 gram of Ponceau 2R dye is dissolved in one liter of water containing 1 ml. of glacial acetic acid. The reagent paper is soaked in this solution nad placed in position on the plate of FIG. 7a as the test disc. 0.01 ml. of serum is added to the confined spot on the sample disc from the capillaries. The center medium is of a porosity as obtained with finely woven nylon or cellophane which has been perforated with electrical sparks, so as to let the whole serum through in large numbers of fine droplets to the test disc. Cloth used for making umbrellas is good for this purpose. Reaction time is 10 minutes at room temperature. After drying, the test paper is removed from the instrument, rinsed in a 10% acetic acid to remove excess dye and dried again before being placed in the colorimeter. This washes off the excess Ponceau 2R dye and leaves only the spots stained where the protein has come through the center medium. The spots are read by densitometer at 540 mu. Other dyes which stain protein such as amido-black may be substituted for the Ponceau 2R.

*Example VII.—Total lipids of serum*

1 gram of oil red O dye is allowed to saturate 1 liter of 50% ethyl alcohol. The reagent paper test disc is impregnated with the dye solution by means of the roller of FIG. 7a. 0.01 ml. of serum is added to the sample receiving paper disc from the capillaries. The center tape is perforated cellophane or perforated polyethylene or finely woven nylon. Contact time is 10 minutes for the three discs. The hot air is allowed to blow for 20 minutes to complete the staining of the lipids. The excess dye is washed off the reagent paper test disc by placing this disc through a 50% aqueous solution of isopropyl alcohol maintained at a temperature of 50° C. with a washing time of twenty minutes. The reagent paper disc is now dried in a drying oven. The stained lipids are read on the densitometer with 540 mµ light filter. Other dyes such as Sudan black may be used to stain the lipids.

*Example VIII.—Radioactive inorganic iodine in blood*

The reagent paper test disc is unstained. Only water is used to wet it with the roller. 0.01 ml. of blood is added to the confined spots on the sample receiving disc from the capillaries. The center medium is untreated cellophane. The reaction time at room temperature is ten minutes and the drying time ten minutes. The reagent paper disc now containing the inorganic iodine is rotated before a scintillation counter attached to a commercial recording device to integrate the counts and draw a graph of their intensity continuously. Curves obtained resemble the curves obtained with the colorimetric densitometer. The area under the curves or peak heights are a measure of the concentration. In this case the organically bound iodine (bound to protein) doesn't pass the cellophane and the sample receiving disc may be separately counted for the protein bound radioactive iodine.

*Example IX.—Inorganic and organic sulfur*

Using the instrument of FIG. 7a, the reagent paper test disc is wetted with water by means of the roller. 0.05 ml. of serum is added to the sample receiving disc from the uniform bore and length capillaries. Usually 40 capillaries are used to deposit 40 samples simultaneously. Using cellophane as the porous membrane permits the inorganic sulfate to migrate in the form of spots to the lower reagent test disc and the protein bound sulfur to remain on the sample receiving paper disc. After drying, both discs are rotated in the X-ray field of an X-ray spectrometer set for determining sulfur. The sample receiving gives the protein bound sulfur values and the reagent containing test disc permits the assaying of the inorganic sulfur.

*Example X.—Total protein*

Referring to FIG. 4a to FIG. 4d, the wash pump is set to pump normal saline. The capillaries are filled, and using the sampling device shown with polyethylene funnels fitted on the capillaries, the capillaries are filled with human serum. Container 123 is filled with biuret reagent. This reagent comprises 10 ml. of 2% copper sulfate solution mixed with 50 ml. of 15% sodium hydroxide. The multiple pump 124 pumps continuously at a rate designed to deliver 1 ml. of the reagent per minute. When the capillary moves to a vertical position, the wash pump 112 is activated to deliver 1 ml. over a period of 30 seconds and then stops. This washes the serum to funnel 122 which pumps the serum and washes at a rate of 1 ml. per minute. The combined serum, wash and reagent are united at junction 125 and pass through a flow colorimeter which records the protein value of the color produced, on a recorder. Peak heights are a measure of concentration of protein. The flow colorimeter fills and siphons off repeatedly in this process.

*Example XI.—Protein in serum*

Using the wash pump of FIG. 4a, but filling the container 111 with a biuret reagent, the reagent is pumped at 1 ml. per minute into the capillaries when the capillary is in the vertical position. When 1.5 ml. has been pumped, the wash pump stops. The capillaries are filled with serum in the sequential device of the figures, as shown in the drawing. The capillaries, when in the vertical position are arranged above one of the test tubes in the circular positioning means 127. When the drip from the capillary has washed into the test tube, a new test tube moves into position to receive the next specimen and reagent. As the test tubes move along, they brush against a vibrating rubber tip rod (not shown) at one point which mixes the solution. Then they pass the reading station shown. As each test tube moves into position in front of the colorimeter, the photocell is exposed and the intensity of reading is recorded on a digital print out. This is a measure of the protein content of the serum.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An automatic chemical analyzer apparatus, comprising in combination, horizontally disposed positioning means;
   at least one holder disposed on said positioning means, designed to hold at least one capillary tube in the horizontal position, including tilting means to tilt said holder so that the tube held therein assumes the vertical position to discharge the contents therefrom;
   a horizontally disposed plate under said positioning means, for holding material, to which the contents of at least said one capillary tube is to be eventually transferred;
   reciprocating means, supporting said horizontally disposed plate, so that said plate is moved up or down, and, tilt actuating means positioned between said plate and positioning means and linked to said holder so that the contents of the capillary tube held therein, empty in a preselected area on the material held on said plate.

2. An apparatus as claimed in claim 1, said positioning means and said plate being of curvilinear configuration, the center of said positioning means and plate being vertically aligned, said vertical reciprocating means being under the centers thereof.

3. An apparatus as claimed in claim 2, said positioning means and plate being of circular configuration, said tube holders being disposed to hold at least said one tube normally in a radial position.

4. An apparatus as claimed in claim 3, there being a plurality of tube holders disposed on said positioning means designed to hold capillary tubes therein normally in a radial position, the vertical movement of said plate engaging at least one of the tilt actuating means so that said at least one tube assume a vertical position to discharge the contents therefrom.

5. An apparatus as claimed in claim 4, including at least one vertical support means which can swing horizontally, a weighted member with a flat surface, horizontally supported by said support means, at a level between said plate and said tilt actuating means, and, program means to swing said support means so that at preset time intervals said weighted member will be disposed over said plate, the upward vertical movement of said plate bringing the contents thereof into forceful pressing contact with said weighted member, removing said weighted member from said contact with the downward vertical movement of said plate.

6. An apparatus as claimed in claim 5, with a holding ring sized to be positionable on said plate and rest on material held on said plate, said ring being adapted to hold a membrane over said material and a sample receiving piece over said membrane so that the sample in said tube is discharged on said sample receiving piece, the pressing contact of said plate and weighted member acting to press said sample through said membrane onto said material.

7. An apparatus as claimed in claim 6, including, recesses in said ring, said weighted member being a weighted disc sized to enter said ring having outwardly biased engaging means therein, the pressing contact of said plate and said weighted disc causing said engaging means to enter said recesses said hold said ring to the weighted disc during the next downward movement of said plate.

8. An apparatus as claimed in claim 7, including a second vertical support means that can swing horizontally, a heating element with a horizontal flat surface supported by said second support means at a level between said plate and said tilt actuating means, said program means also acting to swing said second support means so that at present time intervals said heating element will be disposed over said plate to heat matter thereon.

9. An apparatus as claimed in claim 4 said positioning means including radial slots therein said slots defining a tilting zone, said tube holders being pivotly mounted on said positioning means to hold said tubes radially within said tilting zone so that the tilting action of said tubes can discharge the contents thereof on said plate.

10. An apparatus as claimed in claim 9, said tube holder including, tube clamp means for holding a tube radially, said tilting means including pivot means separated from said clamp means; said tilt actuating means including, a radial path of travel defined in said positioning means, said pivot means being mounted for radial movement therein, a link mechanism, one end of which is connected to said tube holder extending therefrom to below said positioning means, the other end being towards said vertical reciprocating means, and, contact means at said other end disposed for engagement by said plate, the link mechanism being so sized that when said contact means is engaged by said plate, said clamp means will tilt a tube held therein, the pivot means moving radially during the tilting action to maintain the tip of the discharging tube substantially over the place of discharge.

11. An apparatus as claimed in claim 10 there being a plurality of tube holders and tilting means circumferentially disposed on said positioning means each connected to tilt actuating means said contact means being circumferentially disposed about said reciprocating means, said plate simultaneously engaging all of said contact means.

References Cited by the Examiner
UNITED STATES PATENTS 2,642,212  6/53  Currivan _____ 198—33.3 X
2,857,039  10/58 Whitecar _____ 198—33.3

MORRIS O. WOLK, *Primary Examiner.*

JAMES H. TAYMAN, JR., *Examiner.*